G. DE LA PEÑA.
LEVELING ROD.
APPLICATION FILED JULY 22, 1909.
952,275.
Patented Mar. 15, 1910.
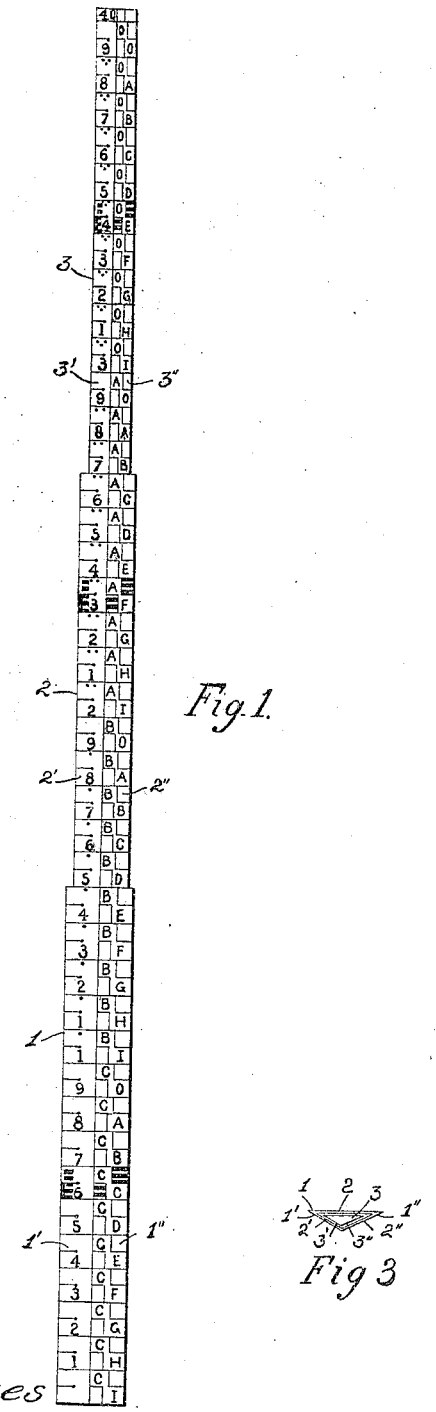
Fig. 1.
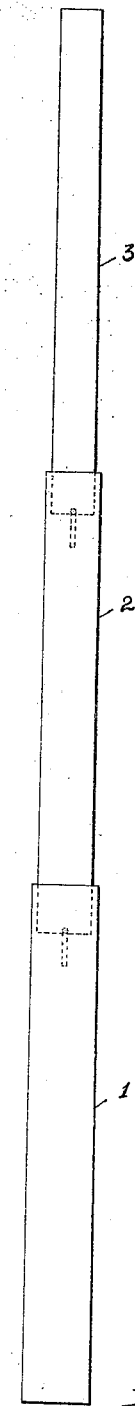
Fig. 2.
Fig 3
Witnesses
Robert Everett
C. F. Hesler
Inventor
Gabriel de la Peña
By
James L. Norris
Atty.

UNITED STATES PATENT OFFICE.

GABRIEL DE LA PEÑA, OF SAN ANTONIO DE LOS BAÑOS, CUBA.

LEVELING-ROD.

952,275. Specification of Letters Patent. Patented Mar. 15, 1910.

Application filed July 22, 1909. Serial No. 508,945.

*To all whom it may concern:*

Be it known that I, GABRIEL DE LA PEÑA, citizen of the Republic of Cuba, residing at San Antonio de los Baños, Cuba, have invented certain new and useful Improvements in Leveling-Rods, of which the following is a specification.

This invention relates to leveling rods for topographic work and the object thereof is to provide a device of that class consisting of a rod of obtuse triangular cross-section, provided with two scales on the two adjacent faces of the obtuse angle, which scales are to be read without turning the rod and are inverted in position with respect to each other. The left hand scale is marked with numbers, and the right hand scale with alphabetical signs (having each a representative value), the arrangement being such that a reading of the second scale will constitute an unequivocal check on the reading of the first scale for the same level, and the sum of the numerical values obtained from the two readings for a given level will be equal to the total length of the rod.

In describing the invention in detail, reference is had to the figures of the annexed drawing, in which similar characters of reference refer to corresponding parts throughout.

In the said drawings: Figure 1 is a front view of a leveling rod constructed in accordance with this invention. Fig. 2 is a rear view. Fig. 3 is a top view thereof.

The leveling rod, as shown, is made up of three sections, 1, 2 and 3, of obtuse triangular cross section, properly adjusted and made to slide one within another, in telescopic fashion, as in ordinary leveling rods. The adjacent surfaces of the obtuse angle of said sections are designated by the numerals 1′, 1″, 2′, 2″, 3′, 3″, and marked thereon appear two distinct and separate scales for readings, the scales being inverted with respect to each other. Generally, the width of each of the surfaces 1′ and 1″ is 0.10 meters, that of each of the surfaces 2′ and 2″ is 0.08 meters, and that of each of the surfaces 3′ and 3″ is 0.06 meters—but these dimensions may be changed.

On the left hand surfaces 1′, 2′ and 3′ appears a scale, similar to that found on any ordinary leveling rod; that is to say, in a length of four meters, for example, four divisions representing one meter each are designated, starting at the lower end, by the numerals 1, 2, 3 and 4, and the intervening spaces are sub-divided into decimeters, half-decimeters and centimeters, using colors that, like black and red, stand out clearly. The decimeter divisions comprised in the second meter length are indicated by the use of one point mark, those of the third meter length by the use of two point marks and those of the fourth by the use of three point marks.

On the right hand surfaces 1″, 2″ and 3″ appears a scale of the same total length as that on the left, but with alphabetical signs instead of numbers and inverted with respect to the first scale; thus, this scale is divided and sub-divided in the same manner as that on the left, namely, into lengths representing meters, decimeters and centimeters, provided the scale on the left is laid out in the metric system, but starting at the upper end and progressing downward. Each sub-division of the first order, namely, one decimeter length, is distinguished by two alphabetical signs, one of which is marked immediately above the central division mark of that sub-division, and represents the numerical value standing for the length of the unit division or meter just preceding, while the other alphabetical sign is marked immediately below said central sub-division mark and represents the numerical value standing for the length of the sub-unit or decimeter just preceding.

In the drawings, the following alphabetical signs have been adopted,—A, B, C, D, E, F, G, H, I and O, giving them the following numerical values: A stands for 1, B for 2, C for 3, D for 4, E for 5, F for 6, G for 7, H for 8, I for 9 and O for 0 or zero. The first decimeter of the first meter, therefore, starting at the upper end, will be marked with the letter O, twice repeated; the second decimeter of the first meter will be marked OA, indicating that there is not a whole meter length preceding, but that there is one decimeter length; the third decimeter in the first meter will be marked OB, which is read "zero meter, two decimeters". The first decimeter in the second meter will be marked AO, which is read "one meter, zero decimeter"; the second decimeter of the second meter will be marked with the letter A twice repeated, which reads "one meter and one decimeter", and so on. The sub-divisions of the second and third order, that is, the half decimeters and centimeters, are marked as in the left hand side scale. By this disposition of the signs on the right hand side section faces, 1″, 2″ and 3″, the following result is obtained: that at any point of the height of the rod, the sum of the numerical values obtained from the direct reading on the left hand side, and those represented by the alphabetical signs from the reading of the right hand side, is a constant quantity which is no other than the total length of the rod. Thus, for example, if 225 is read on the left, the reading at the corresponding height on the right will be AG5, which, replaced by the corresponding numerical values reads 175; and 225+175=400, which is the total length of the rod, or 4.00 meters. Again, if the reading on the left is 365, that at the corresponding point on the right will be OC5, or 035: and 365+035=400. In each case, therefore, a double reading, without turning the rod, will insure an unequivocal check on the operation performed, in the record of readings.

In place of the metric system, any other known system of measure may be used.

What is claimed is:

A leveling rod having two correspondingly graduated scales visible at the same time arranged longitudinally thereon and reversely of each other, one scale having its graduations marked with figures, and the other scale having its graduations marked with alphabetical signs which represent numerical values complementing those of the corresponding graduations of the first scale, so that the sum of the readings of the two scales at a given level will be a constant quantity, and the reading of the second scale will serve as a check on the reading of the first scale.

In testimony whereof I have hereunto set my hand in presence of two subscribing witnesses.

GABRIEL DE LA PEÑA.

Witnesses:
  RICARDO MARÉZ,
  VICTOR NORMAND.